(12) United States Patent
García González et al.

(10) Patent No.: US 12,527,099 B2
(45) Date of Patent: Jan. 13, 2026

(54) X-RAY RADIATION SENSOR DEVICE

(71) Applicant: ams-OSRAM AG, Premstaetten (AT)

(72) Inventors: José Manuel García González, San Antonio de Benageber (ES); Joel Bertomeu Mestre, Oliva (ES); Harald Etschmaier, Graz (AT); Rafael Serrano Gotarredona, Valencia (ES)

(73) Assignee: ams-OSRAM AG, Premstaetten (AT)

( * ) Notice: Subject to any disclaimer, the term of this patent is extended or adjusted under 35 U.S.C. 154(b) by 220 days.

(21) Appl. No.: 18/255,110

(22) PCT Filed: Nov. 23, 2021

(86) PCT No.: PCT/EP2021/082681
§ 371 (c)(1),
(2) Date: May 31, 2023

(87) PCT Pub. No.: WO2022/122374
PCT Pub. Date: Jun. 16, 2022

(65) Prior Publication Data
US 2024/0055464 A1    Feb. 15, 2024

(30) Foreign Application Priority Data
Dec. 10, 2020   (DE) .................. 10 2020 132 963.6

(51) Int. Cl.
*H10F 39/18*    (2025.01)
*A61B 6/42*     (2024.01)
(Continued)

(52) U.S. Cl.
CPC ....... *H10F 39/1892* (2025.01); *A61B 6/4233* (2013.01); *G01T 1/247* (2013.01); *H04N 25/30* (2023.01); *H04N 25/78* (2023.01)

(58) Field of Classification Search
CPC .. H10F 39/1892; H10F 39/189; H10F 39/811; A61B 6/4233; G01T 1/247; H04N 25/30; H04N 25/78
See application file for complete search history.

(56) References Cited

U.S. PATENT DOCUMENTS

2005/0286682 A1* 12/2005 Tkaczyk ............... G01T 1/2018
                                                        378/98.8
2016/0148965 A1    5/2016 Clayton
(Continued)

FOREIGN PATENT DOCUMENTS

DE    102016221481 A1    5/2018
EP        3839578 A1     6/2021

OTHER PUBLICATIONS

International Search Report issued for the corresponding PCT patent application No. PCT/EP2021/082681, dated Mar. 1, 2022, 3 pages (For informational purposes only).
(Continued)

*Primary Examiner* — Edwin C Gunberg
*Assistant Examiner* — Richard O Toohey
(74) *Attorney, Agent, or Firm* — Viering, Jentschura & Partner mbB

(57) ABSTRACT

An X-ray radiation sensor device may include a direct X-ray conversion layer, a plurality of electrodes to provide an electric charge in response to an interaction of an X-ray photon within the direct X-ray conversion layer, a plurality of pixel sensor arrays, and at least one interposer. The direct X-ray conversion layer and the plurality of electrodes are disposed on the top surface of the interposer(s). The plurality of the pixel sensor arrays is disposed on the bottom surface of the interposer(s), and the interposer(s) is configured to electrically couple each of the pixel sensor arrays to a respective portion of the plurality of electrodes.

14 Claims, 7 Drawing Sheets

(51) Int. Cl.
  *G01T 1/24* (2006.01)
  *H04N 25/30* (2023.01)
  *H04N 25/78* (2023.01)

(56) References Cited

U.S. PATENT DOCUMENTS

| | | | |
|---|---|---|---|
| 2018/0120447 A1* | 5/2018 | Ergler | G01T 1/244 |
| 2019/0011578 A1* | 1/2019 | Ergler | H10F 39/018 |
| 2019/0280036 A1 | 9/2019 | Herrmann et al. | |
| 2019/0339402 A1* | 11/2019 | Crestani | G01T 1/243 |
| 2021/0190979 A1 | 6/2021 | Goederer et al. | |

OTHER PUBLICATIONS

Search Report issued for the German patent application No. 10 2020 132 963.6, dated Aug. 13, 2021, 6 pages (For informational purposes only).

Hatsui, T. et al., "A direct detection X ray CMOS image sensor with 500 μm thick high resistivity silicon", published 2013, 4 pages.

Sedgwick, I. et al., "LASSENA: A 6.7 Megapixel, 3 sides Buttable Wafer Scale CMOS Sensor using a novel grid addressing architecture", 2013 International Image Sensor Workshop, Jun. 12-16, 2013, 4 pages, Snowbird Resort, Utah, USA.

Shin, Min-Seok et al., "CMOS X-Ray Detector With Column-Parallel 14.3-bit Extended-Counting ADCs", IEEE Transactions on Electron Devices, Mar. 2013, pp. 1169-1177, vol. 60, No. 3.

Jo, Yun-Rae et al., "CMOS Flat-Panel X-ray Detector With Dual-Gain Active Pixel Sensors and Column-Parallel Readout Circuits", IEEE Transactions on Nuclear Science, Oct. 2014, Jan. 15, 2018, pp. 2472-2479, vol. 61, No. 5, arXiv.

Zoschke, Kai et al., "Full Wafer Redistribution and Wafer Embedding as Key Technologies for a Multi-Scale Neuromorphic Hardware Cluster", 2017 IEEE 19th Electronics Packaging Technology Conference.

* cited by examiner

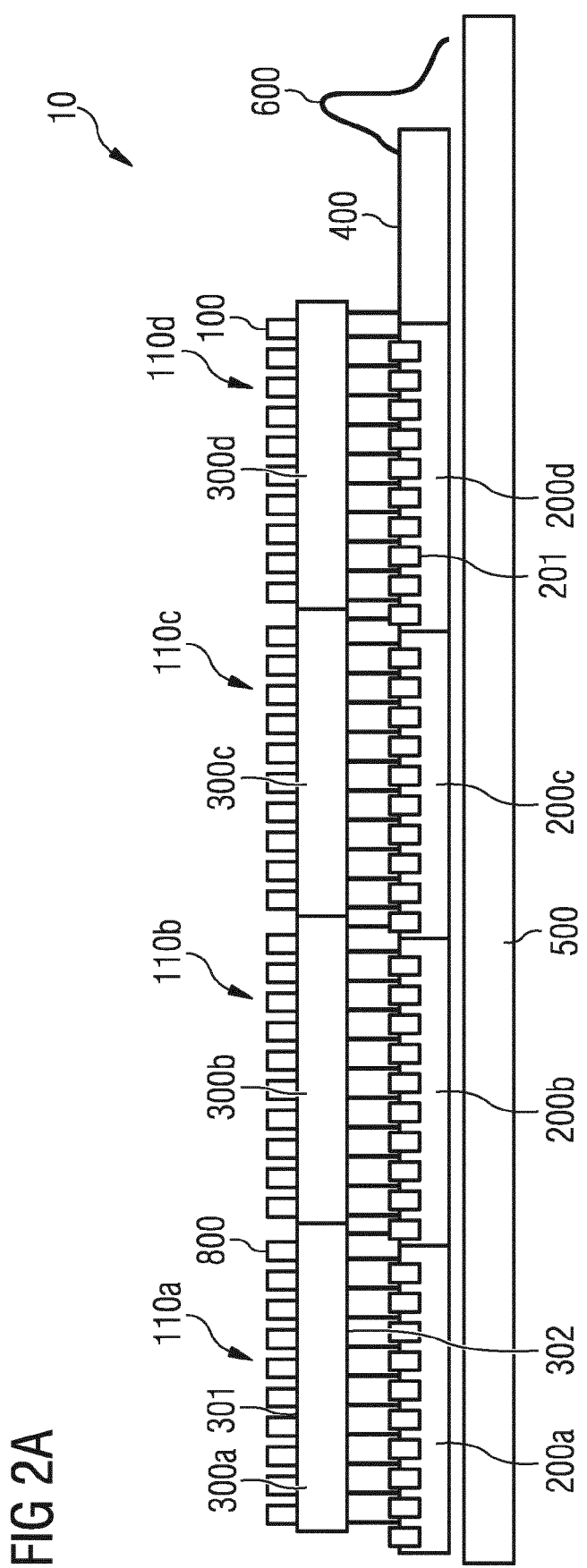

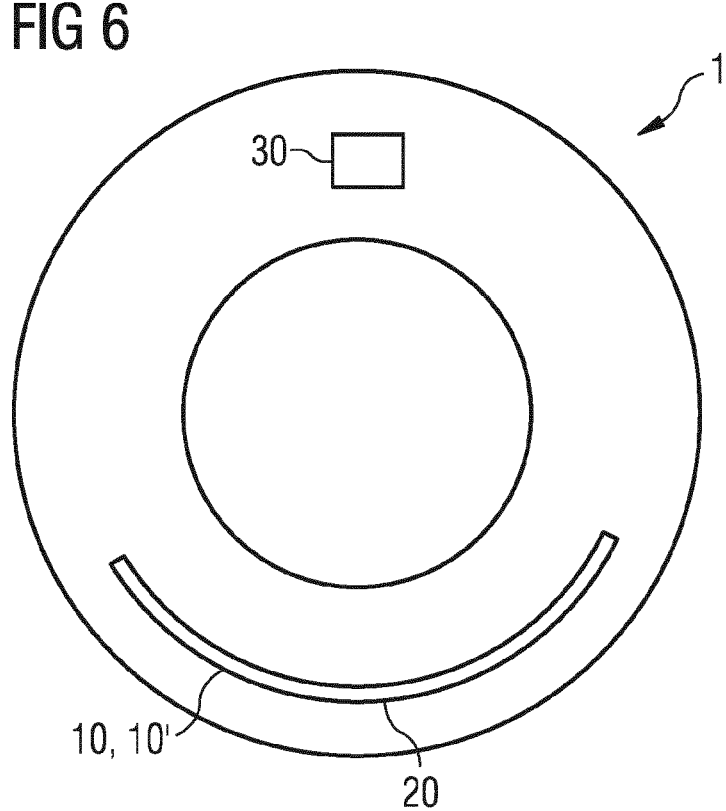

X-RAY RADIATION SENSOR DEVICE

CROSS-REFERENCE TO RELATED APPLICATIONS

The present application is a national stage entry according to 35 U.S.C. § 371 of PCT application No.: PCT/EP2021/082681 filed on Nov. 23, 2021; which claims priority to German patent application 10 2020 132 963.6, filed on Dec. 10, 2020; all of which are incorporated herein by reference in their entirety and for all purposes.

TECHNICAL FIELD

The disclosure relates to an X-ray radiation sensor device which may be used in X-ray products in which large radiation sensitive sensors are needed. The disclosure further relates to a device for medical diagnostics using X-ray radiation.

BACKGROUND

In X-ray equipment, the X-ray radiation emitted by an X-ray source is detected and evaluated after passing through an object, such as human tissue. In X-ray diagnostics, a plurality of applications, for example mammography, need large X-ray radiation-sensitive sensors. A conventional approach is to provide X-ray radiation-sensitive sensors as CMOS sensors. However, there are several problems in large scale CMOS sensors.

Due to the large area of a die, for example 14.5 cm×12 cm, the yield is heavily impacted by process defects which lead to high yield losses. In standard fabrication approaches, the sensor is built using DFM rules which are derived from extensive defect size and density research. Additionally, extensive maintenance is required for keeping the defect density under control. A defect which is large enough can result in the whole wafer having to be thrown away.

Another problem concerns the non-efficient area utilization of a wafer when building the X-ray radiation sensor. Building a simple large die, for example 14.5 cm×12 cm, as required for mammography, implies that a large portion of the wafer area cannot be used. For example, in mammography and for an 8" wafer, only about 55% of the wafer is used.

Moreover, the fabrication process of large scale CMOS sensors usually needs a step of stitching in the manufacturing process. In particular, the large sensor area, larger than a reticle area, requires stitching of metal lines, because the X-ray radiation sensor device is usually larger than the maximum size of the step field in the CMOS manufacturing process. This increases the complexity of manufacturing, and consequently the final cost of the device.

There is a desire to provide an X-ray radiation sensor device which allows to build an X-ray sensor having a large detector area while avoiding the above-described disadvantages of high yield loss, low area utilization, need of stitching and high device costs.

A further desire is to provide a device for medical diagnostics having a large X-ray sensor which can be manufactured while avoiding the above-described problems of yield loss, low area utilization, need of stitching and high device costs.

SUMMARY

A first embodiment of an X-ray radiation sensor device which allows a simplification of its manufacturing process, yield improvement and manufacturing with low costs is specified in claim 1.

The X-ray radiation sensor device of the first embodiment comprises a direct X-ray conversion layer, a plurality of electrodes to provide an electric charge in response to an interaction of an X-ray photon within the X-ray conversion layer, and a plurality of pixel sensor arrays. The X-ray radiation sensor device further comprises at least one interposer having a top surface and a bottom surface. The direct X-ray conversion layer is disposed on the top surface of the at least one interposer. The plurality of the electrodes is disposed on the top surface of the at least one interposer. The plurality of the pixel sensor arrays is disposed on the bottom surface of the at least one interposer. The at least one interposer is configured to electrically couple each of the pixel sensor arrays to a respective portion of the plurality of the electrodes.

The proposed design of the first embodiment of the X-ray radiation sensor device allows to build four-side buttable X-ray sensor devices. As a consequence, an arbitrarily large X-ray radiation detector based on a direct X-ray conversion principle can be built using small pixel sensor arrays, for example sized to a reticle area. In particular, the complete X-ray radiation sensor device can be built without the need for stitching in the sensitive area.

The at least one interposer may contain a silicon material. The at least one silicon interposer can be used for coupling the pixel sensor arrays on the bottom surface of the at least one silicon interposer to the X-ray radiation by connecting the pixel sensor arrays to the electrodes on the top surface of the at least one silicon interposer.

According to a possible configuration of the first embodiment of the X-ray radiation sensor device, the at least one interposer comprises a plurality of first conductive paths to electrically couple each of the pixel sensor arrays to the respective portion of the plurality of the electrodes.

Each of the pixel sensor arrays comprises a plurality of pixel read-out cells. Each of the pixel read-out cells of the plurality of the pixel sensor arrays is configured to provide a respective electric signal in response to the electric charge received from the respective electrode of the respective portion of the plurality of electrodes. Each of the pixel read-out cells of the respective pixel sensor array is electrically connected to a respective one of the electrodes of the respective portion of the plurality of the electrodes via a respective one of the first conductive paths.

A second embodiment of an X-ray radiation sensor device which allows a simplification of its manufacturing process, yield improvement and manufacturing with low costs is specified in claim 4.

The X-ray radiation sensor device of the second embodiment comprises an X-ray conversion layer to convert X-ray radiation into visible light, a plurality of pixel sensor arrays, and at least one interposer having a top surface and a bottom surface. The X-ray conversion layer is disposed on the top surface of the at least one interposer. The at least one interposer includes a plurality of photodiodes. The plurality of the pixel sensor arrays is disposed on the bottom surface of the at least one interposer. The at least one interposer is configured to electrically couple each of the pixel sensor arrays to a respective portion of the plurality of the photodiodes.

The proposed design of the second embodiment of the X-ray radiation sensor device allows to build four-side buttable X-ray sensor devices. As a consequence, an arbitrarily large X-ray radiation detector based on an indirect X-ray conversion principle can be built using small pixel sensor arrays, for example sized to a reticle area. In particular, the complete X-ray radiation sensor device can be built without the need for stitching in the sensitive area.

The at least one interposer may contain a silicon material. The at least one silicon interposer can be used for coupling the pixel sensor arrays on the bottom surface of the at least one silicon interposer to the X-ray radiation by connecting the pixel sensor arrays to the photodiodes in the at least one silicon interposer.

According to a configuration of the second embodiment of the X-ray radiation sensor device, the at least one interposer comprises a plurality of first conductive paths to electrically couple each of the pixel sensor arrays to the respective portion of the plurality of the photodiodes.

According to another configuration of the second embodiment of the X-ray radiation sensor device, each of the pixel sensor arrays comprises a plurality of pixel read out cells. Each of the pixel read-out cells of the plurality of the pixel sensor arrays is configured to provide a respective electric signal in response to the electric charge received from the respective photodiode of the respective portion of the plurality of the photodiodes. Each of the pixel read-out cells of the respective pixel sensor array is electrically connected to a respective one of the photodiodes of the respective portion of the plurality of the photodiodes via a respective one of the first conductive paths.

According to a possible configuration of the first and second embodiment of the X-ray radiation sensor device, the at least one interposer is configured to electrically couple at least a first one of the plurality of the pixel sensor arrays and at least a second one of the plurality of pixel sensor arrays with each other.

According to a possible configuration of the first and second embodiment of the X-ray radiation sensor device, the at least one interposer comprises at least a second conductive path to electrically connect the at least first one of the plurality of the pixel sensor arrays to the at least second one of the plurality of the pixel sensor arrays. That means that the connections between the small pixel sensor arrays are provided using the at least one interposer.

According to a possible configuration of the first and second embodiment of the X-ray radiation sensor device, the sensor device comprises at least an integrated circuit. The at least one integrated circuit is configured to evaluate the respective electric signal of the pixel read-out cells of the plurality of the pixel sensor arrays. The at least one integrated circuit is configured to provide an output signal in response to the evaluation of the respective electric signal of the pixel read-out cells of the plurality of the pixel sensor arrays.

The at least one interposer is configured to electrically couple the at least one integrated circuit to each of the plurality of the pixel sensor arrays. The at least one interposer comprises a plurality of third conductive paths to electrically connect the at least one integrated circuit to each of the plurality of the pixel sensor arrays. That means that the at least one interposer is used to provide electrical connections between the pixel sensor arrays and the at least one integrated circuit.

According to a possible configuration of the first and second embodiment of the X-ray radiation sensor device, the at least one integrated circuit is disposed on the bottom surface of the at least one interposer. In this case, the X-ray radiation sensor device is configured to be four-side buttable.

According to a possible configuration of the first and second embodiment of the X-ray radiation sensor device, the sensor device comprises a plurality of the at least one interposer. Each of the pixel sensor arrays is disposed on the bottom surface of a respective one of the plurality of the at least one interposer. The plurality of the at least one interposer is arranged side-by-side.

According to a possible configuration of the first embodiment of the X-ray radiation sensor device, each of the portions of the plurality of the electrodes is disposed on the top surface of a respective one of the plurality of the at least one interposer. The respective portions of the plurality of the electrodes which are disposed on the top surface of the plurality of the at least one interposer arranged side-by-side abut each other without forming a gap there between.

As a consequence, an arbitrarily large X-ray radiation sensor device can be built using small pixel sensor arrays.

According to a possible configuration of the first and second embodiment of the X-ray radiation sensor device, the sensor device comprises a supporting substrate. The plurality of the pixel sensor arrays and the at least one integrated circuit are mounted to the supporting substrate.

The device for medical diagnostics comprises an X-ray detector which comprises a plurality of the X-ray radiation sensor devices, according to one of the embodiments, as described above. The device for medical diagnostics may be configured as an X-ray apparatus or, especially, as a computed tomography scanner.

Additional features and advantages of the X-ray radiation sensor device are set forth in the detailed description that follows. It is to be understood that both the foregoing general description and the following detailed description are merely exemplary, and are intended to provide an overview or framework for understanding the nature and character of the claims.

BRIEF DESCRIPTION OF THE DRAWINGS

The accompanying drawings are included to provide further understanding, and are incorporated in, and constitute a part of, the specification. As such, the disclosure will be more fully understood from the following detailed description, taken in conjunction with the accompanying figures in which:

FIG. 2A shows a possible configuration of a first embodiment of an X-ray radiation sensor device based on a direct X-ray conversion principle using an interposer for connecting pixel sensor arrays to electrodes, for connecting pixel sensor arrays with each other, and for connecting pixel sensor arrays to at least one integrated circuit;

FIG. 6 shows an embodiment of a device for medical diagnostics comprising an X-ray detector including a plurality of X-ray radiation sensor devices.

DETAILED DESCRIPTION OF THE EMBODIMENTS

Figure 1A:
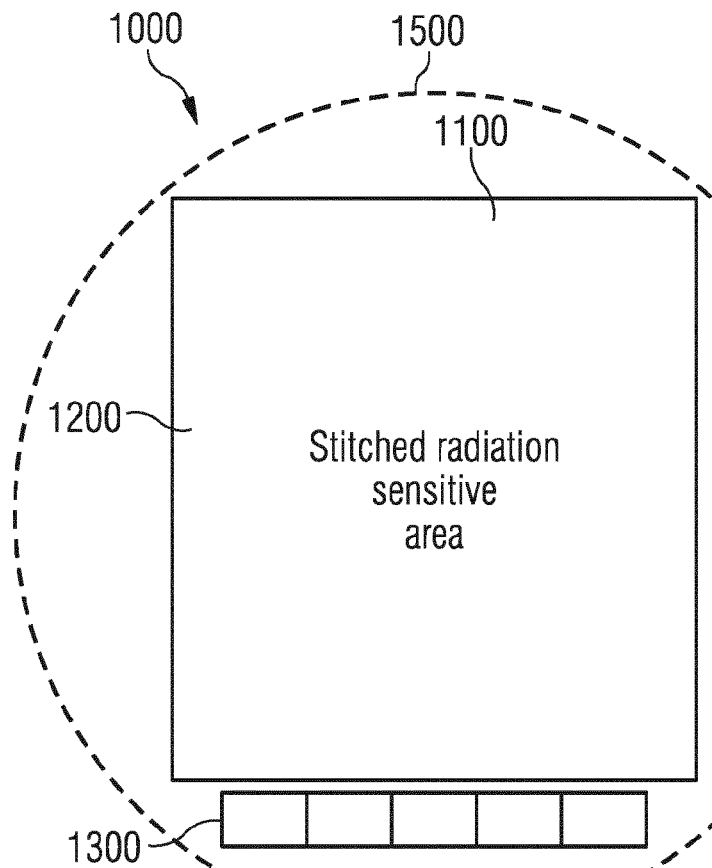
FIG. 1A shows a top view on a wafer comprising a large CMOS X-ray radiation sensor.

FIG. 1A shows a top view onto a wafer 1500 comprising a large scale CMOS sensor 1000. The sensor 1000 comprises a radiation-sensitive area 1200 including a plurality of electrodes 1100 to provide an electric charge in response to an interaction of an X-ray photon within a direct X-ray conversion layer covering the radiation-sensitive area. A plurality of integrated circuits 1300 is arranged at a side of the radiation-sensitive area 1200.

Figure 1B:
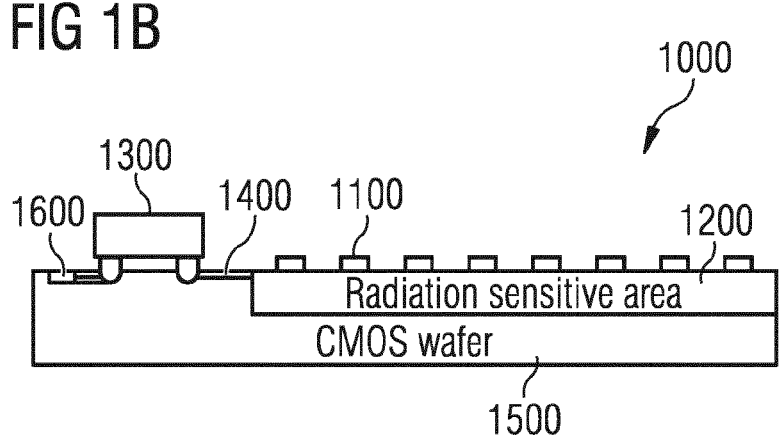
FIG. 1B shows a cross-sectional view through a wafer comprising a CMOS X-ray radiation sensor.

FIG. 1B shows a cross-sectional view of the CMOS X-ray radiation sensor 1000. As illustrated in FIG. 1B, the radiation-sensitive area 1200 is embedded in a top surface of the wafer 1500. A plurality of the electrodes 1100 to respectively provide an electric charge, when a photon of an X-ray radiation hits the direct X-ray conversion layer is distributed over the radiation-sensitive area 1200. Each of the electrodes 1100 is electrically connected to a respective pixel of the radiation-sensitive area 1200 to provide an electric signal in response to an electric charge received from the electrode to which the pixel is connected.

The pixel read-out cells of the X-ray radiation-sensitive area 1200 are connected via a conductive path 1400 to an integrated circuit 1300. The integrated circuit 1300 is electrically connected to the conductive path 1400 by connection elements. The integrated circuit 1300 may be configured as a multi-channel analog-to-digital converter to generate a digital output signal in response to the electric signal received from the pixel read-out cells of the radiation-sensitive area 1200. The digital output signal is provided at a bonding area 1600 for further processing.

Large scale CMOS sensors 1000 are built using stitching in the radiation-sensitive area 1200 in the CMOS processes for building a large-size sensor. However, the need for stitching increases the complexity of the manufacturing process. Additionally, due to the large scale of the die, the yield of such types of products, as shown in FIGS. 1A and 1B, is dramatically effected by process defects. A defect in the radiation-sensitive area 1200 which is big enough can result in the entire X-ray radiation sensor 1000 becoming unusable.

The integrated circuit 1300, for example, a multi-channel ADC, may be fabricated in a different process than the one used for the radiation-sensitive area 1200. In particular, the integrated circuit 1300 may be fabricated using a more complex process and be more prone to suffer defects due to the amount of implemented electronics. In conclusion, a configuration of a CMOS sensor 1000, as illustrated in FIGS. 1A and 1B, has significant yield loss, bad area utilization of a wafer, and is additionally manufactured in a complex fabrication process using stitching in the radiation-sensitive area.

FIG. 2A shows a first embodiment of an X-ray radiation sensor device 10 based on a direct X-ray conversion principle. The X-ray radiation sensor device 10 comprises a plurality of electrodes 100, a plurality of pixel sensor arrays 200a, 200b, 200c and 200d and a plurality of interposers 300a, 300b, 300c and 300d. The X-ray radiation sensor device 10 further comprises a direct X-ray conversion layer 800 which covers the plurality of the electrodes 100. The electrodes 100 are configured to provide an electric charge in response to an interaction of an X-ray photon within the direct X-ray conversion layer 800.

Each of the interposers 300a, 300b has a top surface 301 and a bottom surface 302. As illustrated in FIG. 2A, the direct X-ray conversion layer 800 and the plurality of the electrodes 100 are disposed on the top surface 301 of each of the interposers 300a, ..., 300d. The electrodes 100 may be integrated/embedded in the material of each of the interposers 300a, ..., 300d. The pixel sensor arrays 200a, ..., 200d are disposed on the respective bottom surface 302 of each of the interposers 300a, ..., 300d.

The interposers 300a, ..., 300d are respectively configured to electrically couple each of the pixel sensor arrays 200a, 200b, 200c, 200d to a respective portion 110a, 110b, 110c, 110d of the plurality of the electrodes 100. Each of the portion 110a, ..., 110d of the electrodes 100 is arranged on the top surface 301 of a respective one of the interposers 300a, ..., 300d. Each of the portions 100a, ..., 100d of the electrodes 100 may be integrated/embedded in the material of each of the interposers 300a, ..., 300d.

The interposers 300a, ..., 300d may be configured as silicon interposers, i.e. they contain a silicon material. The silicon interposers are used for connecting the pixel sensor arrays 200a, ..., 200d to the radiation, i.e. the electrodes 100.

Each of the interposers 300a, ..., 300d comprises a plurality of first conductive paths to electrically couple each of the pixel sensor arrays 200a, ..., 200d to the respective portion 110a, ..., 110d of the electrodes 100.

The pixel sensor arrays 200a, ..., 200d respectively comprise a plurality of pixel read-out cells 201. The pixel read-out cells 201 of the respective pixel sensor arrays 200a, ..., 200d are electrically connected to a respective one of the electrodes 100 of the portions 110a, ..., 110d of the plurality of the electrodes via a respective one of the first conductive paths. The first conductive paths are integrated in each of the interposers 300a, ..., 300d.

Each of the interposers 300a, ..., 300d is configured to electrically couple the pixel sensor arrays 200a, ..., 200d with each other. For this purpose, each of the interposers 300a, ..., 300d comprises a respective second conductive path 320 to electrically connect the pixel sensor arrays to each other.

Each of the pixel read-out cells 201 of the plurality of the pixel sensor arrays 200a, ..., 200d is configured to provide a respective electric signal, for example a current or voltage signal, in response to the electric charge received from the respective electrode 100 of the portions 110a, ..., 110d of the electrodes.

As shown in FIG. 2A, the X-ray radiation sensor device 10 comprises at least one integrated circuit 400. The at least one integrated circuit 400 is configured to evaluate the respective electric signal of the pixel read-out cells 201, and to provide an output signal in response to the evaluation of the respective electric signal of the pixel read-out cells 201.

The at least one integrated circuit 400 may be configured to perform sensing, signal conversion, processing and/or transmission of the respective electric signal of the pixel read-out cells 201. In particular, the at least one integrated circuit may be configured as a multi-channel analog-to-digital converter (mADC).

Each of the interposers 300a, ..., 300d is configured to electrically couple the at least one integrated circuit 400 to each of the pixel sensor arrays 200a, ..., 200d. For this purpose, the interposers 300a, ..., 300d may comprise third conductive paths 330 to electrically connect the at least one integrated circuit 400 to each of the pixel sensor arrays 200a, ..., 200d.

The interposers 300a, ..., 300d are arranged side-by-side. The respective portions 110a, ..., 110d of the electrodes 100 which are disposed on the top surface 301 of the interposers arranged side-by-side abuts each other without forming a gap there between. Thus, a large radiation sensor can be built.

The X-ray radiation sensor device 10 comprises a supporting substrate 500. The pixel sensor arrays 200a, ..., 200d and the at least one integrated circuit 400 are mounted to the supporting substrate 500. The at least one integrated circuit 400 may be electrically connected by a bond via 600 to a bonding area on the supporting substrate 500.

Figure 2B:
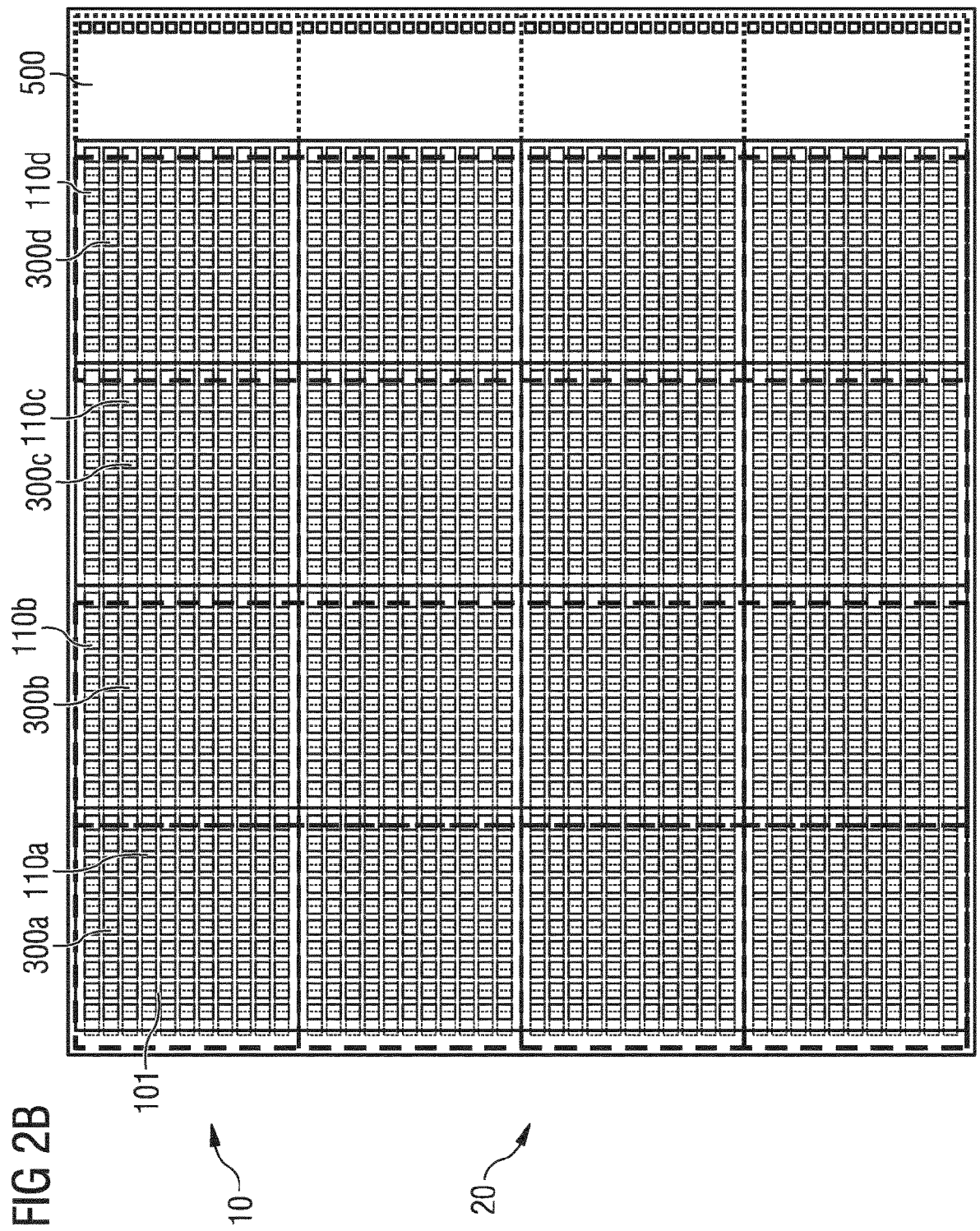
FIG. 2B shows a top view of an X-ray detector including the first embodiment of X-ray radiation sensor devices.

FIG. 2B shows a top view of an X-ray detector 20 comprising a plurality of the X-ray radiation sensors 10. The proposed approach of the X-ray radiation sensor devices 10 allows to build a large radiation sensitive area, the respective portions 110a, ..., 110d of the electrodes 100 which are disposed on the top surface 301 of the interposers abuts each other without forming a gap there between.

Figure 3:
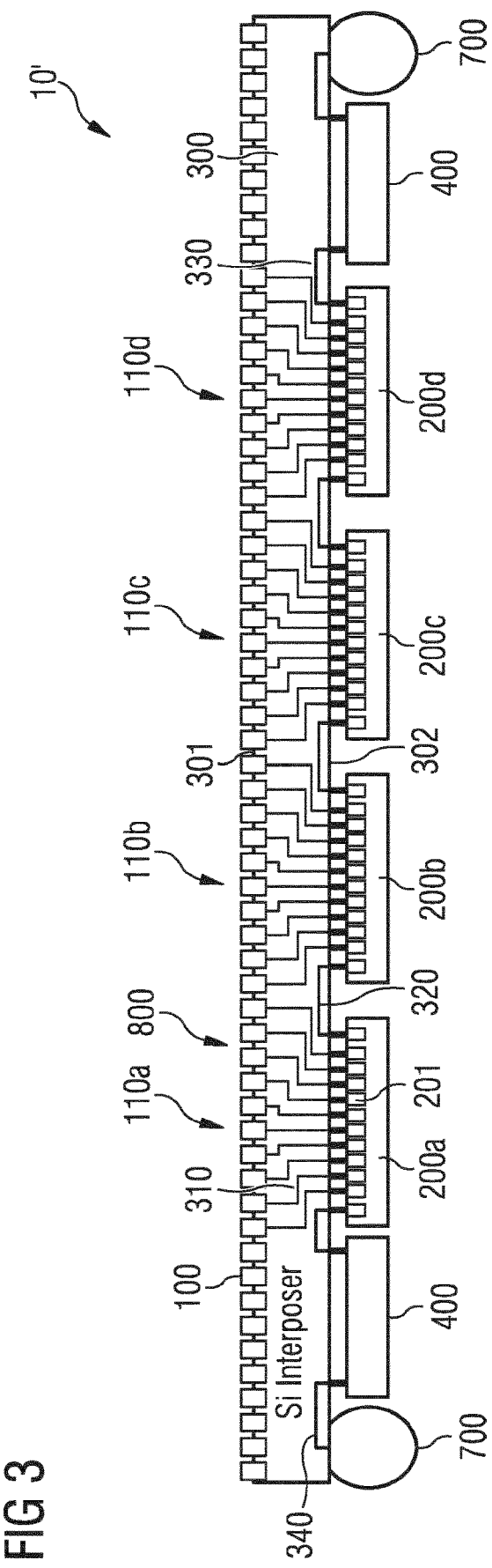
FIG. 3 shows another possible configuration of the first embodiment of an X-ray radiation sensor device comprising an interposer for connecting pixel sensor arrays to electrodes, for connecting pixel sensor arrays with each other, and for connecting pixel sensor arrays to integrated circuits.

FIG. 3 shows another configuration of the first embodiment 10' of an X-ray radiation sensor device based on the direct X-ray conversion principle. Identical components of the X-ray radiation sensor devices 10 and 10' are indicated with the same reference numbers.

The X-ray radiation sensor device 10' comprises a plurality of electrodes 100, a plurality of pixel sensor arrays 200a, 200b, 200c and 200d, and an interposer 300 having a top surface 301 and a bottom surface 302. The X-ray radiation sensor device 10' further comprises a direct X-ray conversion layer 800 covering the electrodes 100. The electrodes 100 provide an electric charge in response to an interaction of an X-ray photon within the direct X-ray conversion layer 800. The direct X-ray conversion layer 800 and the electrodes 100 are disposed on the top surface 301 of the interposer 300. The electrodes 100 may be integrated/embedded in the material of the interposer 300. The pixel sensor arrays 200a, ..., 200d are disposed on the bottom surface 302 of the interposer 300.

The interposer 300 is configured to electrically couple each of the pixel sensor arrays 200a, 200b, 200c and 200d to a respective portion 110a, 110b, 110c and 110d of the plurality of electrodes 100. The interposer 300 may be configured as a silicon interposer containing silicon material.

As illustrated in FIG. 3, the interposer 300 comprises a plurality of first conductive paths 310 to electrically couple each of the pixel sensor arrays 200a, ..., 200d to the respective portion 110a, ..., 110d of the plurality of the electrodes 100.

Each of the pixel sensor arrays 200a, ..., 200d comprises a plurality of pixel read-out cells 201. Each of the pixel read-out cells 201 of the respective pixel sensor arrays 200a, ..., 200d is electrically connected to a respective one of the electrodes 100 of the portions 110a, ..., 110d of the plurality of the electrodes via a respective one of the first conductive paths 310.

Furthermore, the interposer 300 is configured to electrically couple the pixel sensor arrays 200a, ..., 200d with each other. In particular, the interposer 300 comprises second conductive paths 320 to electrically connect the pixel sensor arrays 200a, ..., 200d with each other.

Each of the pixel read-out cells 201 of the pixel sensor arrays 200a, ..., 200d is configured to provide a respective electric signal in response to the electric charge received from the respective electrode 100 of the respective portion 110a, ..., 110d of the plurality of the electrodes 100.

The X-ray radiation sensor device 10' comprises at least an integrated circuit 400. The at least one integrated circuit 400 is configured to evaluate the respective electric signal of the pixel read-out cells 201 of the plurality of the pixel sensor arrays 200a, ... 200d. The at least one integrated circuit 400 is configured to provide an output signal in response to the evaluation of the respective electric signal of the pixel read-out cells 201 of the plurality of the pixel sensor arrays 200a, ..., 200d.

The at least one integrated circuit 400 is configured to perform sensing, signal conversion, processing and/or transmission of the respective electric signal of the pixel read-out cells 201 of the plurality of the pixel sensor arrays 200a, ..., 200d. The at least one integrated circuit 400 may be configured, for example, as a multi-channel analog-to-digital converter (mADC).

The interposer 300 is configured to electrically couple the at least one integrated circuit 400 to each of the plurality of the pixel sensor arrays 200a, ..., 200d. In particular, the interposer 300 comprises a plurality of third conductive paths 330 to electrically connect the at least one integrated circuit 400 to each of the pixel sensor arrays 200a, ..., 200d.

As illustrated in FIG. 3, in contrast to the approach of the X-ray radiation sensor device 1 of FIG. 2A, according to the embodiment 10' of the X-ray radiation sensor device 1' the at least one integrated circuit 400 is disposed on the bottom surface 302 of the interposer 300. This enables to provide X-ray radiation sensor 10' as a four-side buttable device. Moreover, as shown in FIG. 3, the portions 110a, ..., 110d of the plurality of the electrodes 100 can be arranged side-by-side on the top surface 301 of the interposer 300 without a gap there between. This allows to realize a large X-ray radiation sensitive area.

For external connection, the X-ray radiation sensor device may comprise connection elements 700, for example solder bumps. The at least one integrated circuit 400 may be connected to connection elements 700 via fourth conductive paths 340 being embedded in the interposer 300.

Figure 4:
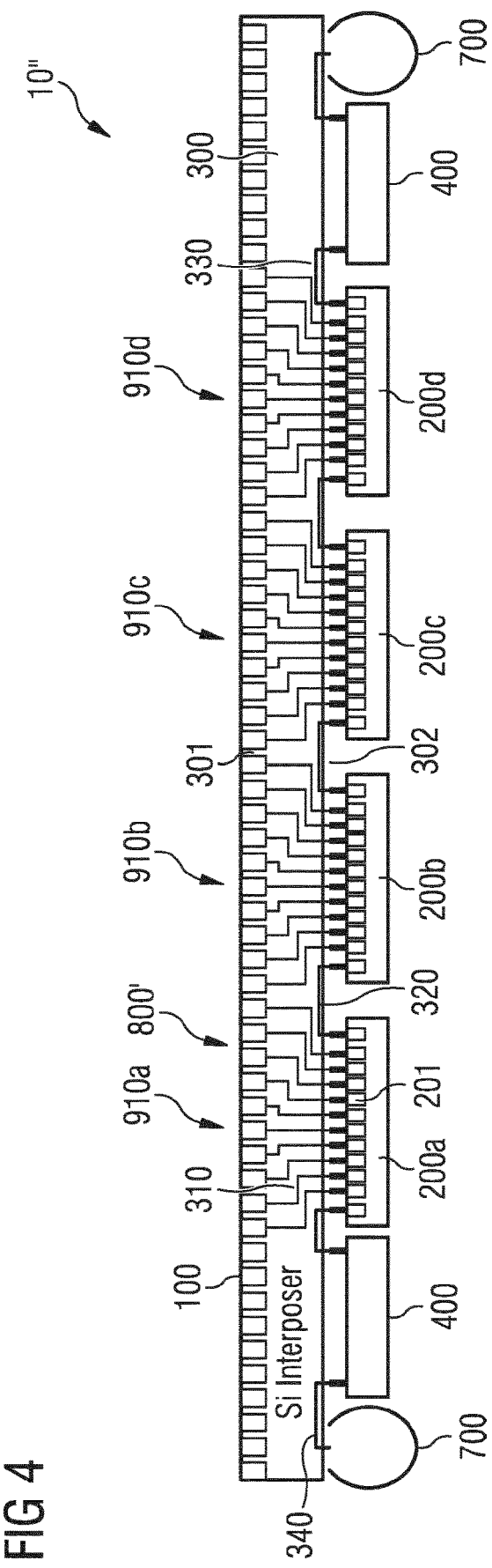
FIG. 4 shows a possible configuration of a second embodiment of an X-ray radiation sensor device based on an indirect X-ray conversion principle using an interposer for connecting pixel sensor arrays to photodiodes, for connecting pixel sensor arrays with each other, and for connecting pixel sensor arrays to at least one integrated circuit.
Figure 5:
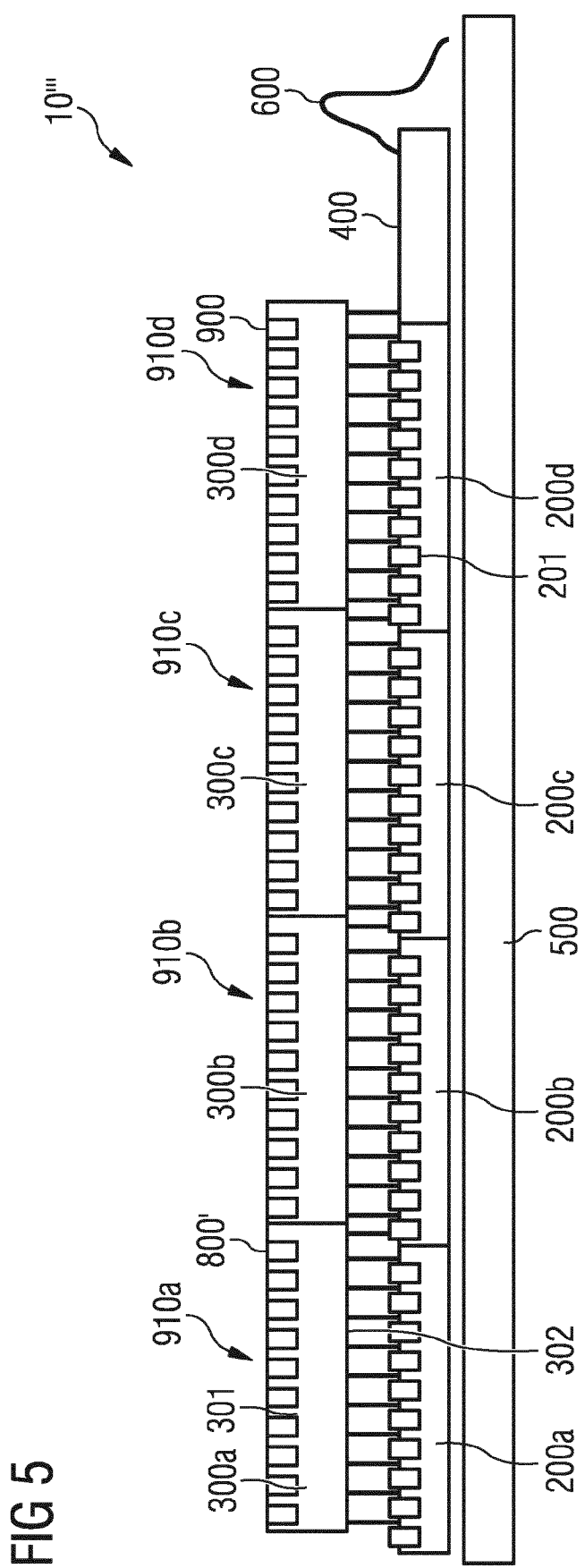
FIG. 5 shows another possible configuration of the second embodiment of an X-ray radiation sensor device comprising an interposer for connecting pixel sensor arrays to photodiodes, for connecting pixel sensor arrays with each other, and for connecting pixel sensor arrays to integrated circuits.

FIGS. 4 and 5 show possible configurations of a second embodiment of an X-ray radiation sensor device. In contrast to the first embodiment, the X-ray radiation sensor devices 10", 10'" of the second embodiment are based on an indirect X-ray conversion principle. Identical components of the X-ray radiation sensor devices 10, 10' and 10" and 10'" are indicated with the same reference numbers. In the following, only the differences to the first embodiment 10, 10' of the X-ray radiation sensor device are described. Otherwise, with regard to the arrangement and function of the various components, reference is made to the explanations in connection with FIGS. 2A and 3

Referring to FIG. 4, the X-ray radiation sensor device 10" comprises an X-ray conversion layer 800' to convert X-ray radiation into visible light, a plurality of pixel sensor arrays 200a, ..., 200d, and an interposer 300 having a top surface 301 and a bottom surface 302. The X-ray conversion layer 800' is disposed on the top surface 301 of the at least one interposer 300. The interposer 300 includes a plurality of photodiodes 900. The photodiodes 900 may be integrated/embedded in the material of the interposer 300. The plurality of the pixel sensor arrays 200a, ..., 200d is disposed on the bottom surface 302 of the interposer 300. The interposer 300 is configured to electrically couple each of the pixel sensor arrays 200a, ..., 200d to a respective portion 910a, ..., 910d of the plurality of the photodiodes 900.

The interposer 300 comprises a plurality of first conductive paths 310 to electrically couple each of the pixel sensor arrays 200a, . . . , 200d to the respective portion 910a, . . . , 910d of the plurality of the photodiodes 900. Each of the pixel sensor arrays 200a, . . . , 200d comprises a plurality of pixel read out cells 201. Each of the pixel read-out cells 201 of the plurality of the pixel sensor arrays 200a, . . . , 200d is configured to provide a respective electric signal in response to the electric charge received from the respective photodiode 900 of the respective portion 910a, . . . , 910d of the plurality of the photodiodes 900. Each of the pixel read-out cells 201 of the respective pixel sensor array 200a, . . . , 200d is electrically connected to a respective one of the photodiodes 900 of the respective portion 910a, . . . , 910d of the plurality of the photodiodes 900 via a respective one of the first conductive paths 310.

FIG. 5 shows another configuration of the second embodiment 10''' of an X-ray radiation sensor device based on the indirect X-ray conversion principle. Identical components of the X-ray radiation sensor devices 10'' and 10''' are indicated with the same reference numbers.

Similar to the configuration 10 of the first embodiment of the X-ray radiation device, the configuration 10''' of the second embodiment of the X-ray radiation sensor device comprises a plurality of interposers 300a, . . . , 300d. Each of the pixel sensor arrays 200a, . . . , 200d is disposed on the bottom surface 302 of a respective one of the plurality of the interposers 300a, . . . , 300d. The plurality of the interposers 300a, . . . , 300d is arranged side-by-side. Each of the portion 910a, . . . , 910d of the plurality of the photodiodes 900 is arranged in a respective one of the interposers 300a, . . . , 300d. The photodiodes 900 may be integrated/embedded in the material of each of the interposers 300a, . . . , 300d. Otherwise, with regard to the arrangement and function of the various components, reference is made to the explanations in connection with FIG. 2A.

The most important features and technical advantages of the designs 10, 10', 10'' and 10''' of the X-ray sensor devices are summarized below.

According to the proposed approaches 10, 10', and 10'', 10''' of the X-ray radiation sensor device, at least one interposer is used to build a sensing element, for example, by implementing electrodes 100 or photodiodes 900 for providing an electric charge in response to X-ray radiation. The electrodes 100 or photodiodes 900 may be integrated/embedded in the material of the interposer 300 or each of the interposers 300a, . . . , 300d.

The at least one interposer may contain a silicon material.

The at least one interposer is suited to provide several electrical connections. The at least one interposer may be configured for connecting the electrodes 100, needed for X-ray direct conversion into an electric charge, or the photodiodes 900 to the (CMOS) pixel sensor arrays 200a, . . . , 200d. Furthermore, the at least interposer may be configured for connecting the pixel sensor arrays 200a, . . . , 200d to the at least one integrated circuit 400, for example a multi-channel ADC. Moreover the at least one interposer may be configured for connecting the at least one integrated circuit 400 to an external electronic.

The at least one interposer may further be configured to provide redistribution capabilities. In particular, larger pitches between the electrodes 100 on the top surface 301 of the at least one interposer may be transformed by the at least one interposer to smaller pitches between connections for connecting the pixel sensor arrays at the bottom surface 302 of the at least one interposer. Using the interposer and its redistribution capabilities allows the ratio of utilized area between top and bottom layers to be reduced, i.e. the electrodes 100 on the top surface of the at least one interposer and the pixel sensor arrays 200a, . . . , 200d arranged on the bottom surface of the interposer.

Using the additional space created on the bottom surface 302 of the at least one interposer allows to place additional dies, for example integrated circuits, to perform sensing, signal conversion, processing and/or transmission of information.

The sensitive area which is formed by the pixel sensor arrays 200a, . . . , 200d may be split in non-stitched areas. The area of an pixel sensor array 200a, . . . , 200d can be sized as large as a step field. The pixel sensor arrays may be configured as small pieces, for example, sized to a reticle area. Since the respective radiation-sensitive area of the pixel sensor arrays 200a, . . . , 200d is reduced, there is no need for stitching in the CMOS process. Moreover, the reduction of the radiation-sensitive area allows to use standard DFM rules so that the fabrication process of the X-ray sensor devices 10, 10', 10'' and 10''' is simplified.

Furthermore, since the radiation-sensitive area is reduced, almost the full wafer can be used during the manufacturing process for building the full tile.

Moreover, a defect inside one of the pixel sensor arrays does not result in the entire wafer becoming unusable. Instead, only the damaged pixel sensor array has to be rejected. The yield improvement and the effective utilization of the wafer area reduce the cost of the final product.

The proposed design of the X-ray radiation sensor device 10, 10', 10'' and 10''' allows to provide a four-side buttable die that is able to build flat panel X-ray detectors that are nearly as large as desired.

The X-ray radiation sensor device 10, 10', 10'' and 10''' may be used in a plurality of X-ray applications in which large radiation-sensitive sensors are needed. FIG. 6 shows an embodiment of a device for medical diagnostics 1 being configured as an X-ray apparatus, especially a computed tomography scanner.

The computed tomography scanner comprises an X-ray radiation source 30 to provide X-ray radiation which is received by an X-ray detector 20. The X-ray detector 20 comprises a plurality of the above-described X-ray radiation sensor devices 10, 10', 10'' or 10''' which allows the formation of a large X-ray radiation-sensitive area.

The embodiments of the X-ray radiation sensor device disclosed herein have been discussed for the purpose of familiarizing the reader with novel aspects of the design of the X-ray radiation sensor device. Although preferred embodiments have been shown and described, many changes, modifications, equivalents and substitutions of the disclosed concepts may be made by one having skill in the art without unnecessarily departing from the scope of the claims.

In particular, the design of the X-ray radiation sensor device is not limited to the disclosed embodiments, and gives examples of many alternatives as possible for the features included in the embodiments discussed. However, it is intended that any modifications, equivalents and substitutions of the disclosed concepts be included within the scope of the claims which are appended hereto.

Features recited in separate dependent claims may be advantageously combined. Moreover, reference signs used in the claims are not limited to be construed as limiting the scope of the claims.

Furthermore, as used herein, the term "comprising" does not exclude other elements. In addition, as used herein, the article "a" is intended to include one or more than one component or element, and is not limited to be construed as meaning only one.

LIST OF REFERENCE SIGNS 1 device for medical diagnostics
10, 10' X-ray radiation sensor device
20 X-ray detector
30 X-ray source
100 electrodes
110a, ..., 110d portion of the electrodes
200a, ..., 200d pixel sensor array
300, 300a, ..., 300d interposer
310, 320, 330, 340 conductive path
400 integrated circuit
500 supporting substrate
600 bonding wire
700 connection element
800 X-ray conversion layer
1000 X-ray CMOS sensor
1100 electrodes
1200 radiation-sensitive area
1300 integrated circuit
1400 conductive path
1500 wafer
1600 bonding area

The invention claimed is:

1. An X-ray radiation sensor device comprising:
a direct X-ray conversion layer;
a plurality of electrodes configured to provide an electric charge in response to an interaction of an X-ray photon within the direct X-ray conversion layer;
a plurality of pixel sensor arrays; and
at least one interposer having a top surface and a bottom surface;
wherein the direct X-ray conversion layer is disposed on the top surface of the at least one interposer;
wherein the plurality of electrodes is disposed on the top surface of the at least one interposer and embedded in a material of the at least one interposer;
wherein the plurality of pixel sensor arrays is disposed on the bottom surface of the at least one interposer;
wherein the at least one interposer is configured to electrically couple each of the pixel sensor arrays to a respective portion of the plurality of electrodes;
wherein the at least one interposer is configured to electrically couple at least a first one of the plurality of pixel sensor arrays and at least a second one of the plurality of pixel sensor arrays with each other;
wherein the at least one interposer comprises a plurality of first conductive paths to electrically couple each of the pixel sensor arrays to the respective portion of the plurality of electrodes; and
wherein the at least one interposer comprises at least a second conductive path being configured to directly electrically interconnect the at least first one of the plurality of pixel sensor arrays and the at least second one of the plurality of pixel sensor arrays.

2. The X-ray radiation sensor device of claim 1, wherein each of the pixel sensor arrays comprises a plurality of pixel read-out cells; wherein each of the pixel read-out cells of the plurality of pixel sensor arrays is configured to provide a respective electric signal in response to the electric charge received from the respective electrode of the respective portion of the plurality of electrodes; and wherein each of the pixel read-out cells of the respective pixel sensor array is electrically connected to a respective one of electrodes of the respective portion of the plurality of electrodes via a respective one of the first conductive paths.

3. The X-ray radiation sensor device of claim 1, wherein the X-ray radiation sensor device is configured to be four-side buttable.

4. The X-ray radiation sensor device of claim 1, wherein the at least one interposer comprises a plurality of interposers;
wherein each of the pixel sensor arrays is disposed on the bottom surface of a respective one of the plurality of interposers; and
wherein the plurality of interposers is arranged side-by-side.

5. The X-ray radiation sensor device of claim 4, wherein each of the portion of the plurality of electrodes is disposed on the top surface of a respective one of the plurality of interposers; and
wherein the respective portions of the plurality of electrodes disposed on the top surface of the plurality of interposers that are arranged side-by-side abuts each other without forming a gap there between.

6. The X-ray radiation sensor device of claim 1, wherein the at least one interposer contains a silicon material.

7. A device for medical diagnostics, comprising:
an X-ray detector comprising a plurality of X-ray radiation sensor devices of claim 1;
wherein the device is configured as an X-ray apparatus.

8. An X-ray radiation sensor device comprising:
an X-ray conversion layer configured to convert X-ray radiation into visible light;
a plurality of pixel sensor arrays; and
at least one interposer having a top surface and a bottom surface;
wherein the X-ray conversion layer is disposed on the top surface of the at least one interposer;
wherein the at least one interposer includes a plurality of photodiodes being embedded in a material of the at least one interposer;
wherein the plurality of pixel sensor arrays is disposed on the bottom surface of the at least one interposer;
wherein the at least one interposer is configured to electrically couple each of the pixel sensor arrays to a respective portion of the plurality of photodiodes;
wherein the at least one interposer is configured to electrically couple at least a first one of the plurality of pixel sensor arrays and at least a second one of the plurality of pixel sensor arrays with each other;
wherein the at least one interposer comprises a plurality of first conductive paths to electrically couple each of the pixel sensor arrays to the respective portion of the plurality of photodiodes; and
wherein the at least one interposer comprises at least a second conductive path being configured to directly electrically interconnect the at least first one of the plurality of pixel sensor arrays and the at least second one of the plurality of pixel sensor arrays.

9. The X-ray radiation sensor device of claim 8, wherein each of the pixel sensor arrays comprises a plurality of pixel read-out cells; wherein each of the pixel read-out cells of the plurality of pixel sensor arrays is configured to provide a respective electric signal in response to the electric charge received from the respective photodiode of the respective portion of the plurality of photodiodes; and wherein each of the pixel read-out cells of the respective pixel sensor array is electrically connected to a respective one of the photodiodes of the respective portion of the plurality of photodiodes via a respective one of the first conductive paths.

10. The X-ray radiation sensor device of claim 8, further comprising: at least one integrated circuit; wherein the at least one integrated circuit is configured to evaluate the respective electric signal of the pixel read-out cells of the plurality of pixel sensor arrays; and wherein the at least one integrated circuit is configured to provide an output signal in response to the evaluation of the respective electric signal of the pixel read-out cells of the plurality of pixel sensor arrays.

11. The X-ray radiation sensor device of claim 10,
   wherein the at least one interposer is configured to electrically couple the at least one integrated circuit to each of the plurality of pixel sensor arrays.

12. The X-ray radiation sensor device of claim 11,
   wherein the at least one interposer comprises a plurality of third conductive paths to electrically connect the at least one integrated circuit to each of the plurality of pixel sensor arrays.

13. The X-ray radiation sensor device of claim 10,
   wherein the at least one integrated circuit is disposed on the bottom surface of the at least one interposer.

14. The X-ray radiation sensor device of claim 10, further comprising:
   a supporting substrate; and
   wherein the plurality of pixel sensor arrays and the at least one integrated circuit are mounted to the supporting substrate.

\* \* \* \* \*